United States Patent Office 3,840,478
Patented Oct. 8, 1974

3,840,478
CATALYST OF COPPER OXIDE-ZINC-OXIDE-CHROMIUM OXIDE FOR METHANOL SYNTHESIS
Akitomo Uda and Setsunobu Asano, Niigata, Japan, assignors to Mitsubishi Gas Chemical Co., Inc., Tokyo, Japan
No Drawing. Filed Dec. 14, 1971, Ser. No. 207,994
Claims priority, application Japan, Dec. 31, 1970, 46/128,702
Int. Cl. B01j *11/22*
U.S. Cl. 252—468
9 Claims

ABSTRACT OF THE DISCLOSURE

Copper-zinc-chromium system catalyst for synthesis of methanol, which is superior in heat resistance and durabiliyt and is prepared by mixing, in the presence of water, chromium trioxide with a substance obtained from pyrolysis of basic ammonium copper chromate at 300° to 400° C., mixing basic copper carbonate and basic zinc carbonate therewith, kneading, drying, calcining at 200° to 350° C. to decompose the carbonates and further post-calcining at 250° to 450° C.

---

This invention relates to a copper-zinc-chromium system catalyst useful for synthesis of methanol from hydrogen and carbon oxides and a preparation method thereof.

As a catalyst for methanol synthesis from hydrogen and carbon oxides, a copper-zinc-chromium system catalyst is well known. This catalyst is poor in heat resistance and durability, notwithstanding its relatively high catalytic activity. Various preparation methods have been proposed to improve such properties. Among these, there is one of methods wherein gruel-like copper oxide or copper hydroxide is mixed and kneaded with a zinc-chromium compound obtained by allowing an aqueous chromic acid solution to react with zinc oxide (hereinafter referred to as "Method A"). Another method is that gruel-like zinc oxide is mixed and kneaded with an aqueous chromic acid solution dissolving copper oxide (dissolved in the form of copper chromate) (hereinafter referred to as "Method B"). Further another proposal is to prepare a catalyst from precipitates obtained from respective aqueous solutions or a mixed aqueous solution of copper, zinc and chromium salts by the use of alkaline aqueous solutions (hereinafter referred to as "Method C"). In addition, a method wherein a powder mixture of copper oxide and zinc oxide is mixed and kneaded with an aqueous chromic acid solution (hereinafter referred to as "Method D") and a method wherein co-precipitates obtained from a mixed aqueous solution of a copper salt and a zinc salt are mixed and kneaded with an aqueous chromic acid solution (hereinafter referred to as "Method E") are also known.

In order for these copper-containing catalysts to maintain high catalytic activity as well as heat resistance and durability, it is required that they contain a large amount of copper as much as possible and said copper is dispersed finely and homogeneously among the zinc-chromium compound or the like. However, homogeneous dispersion of copper can by no means be achieved by "Method A" or "Method C" wherein respective separate precipitates are mixed togehter, because solid powders or gruel-like substances having little reactivity to each other are thereby merely mechanically mixed. It is the same in "Method C" wherein co-precipitate from a mixed aqueous solution of three salts is used, because it is difficult to square the rates of precipitation of three hydroxides with each other. On the other hand, in "Method D" and "Method E," the reaction of chromic acid and zinc oxide proceeds far faster than that of chromic acid and copper oxide, thereby copper cannot homogeneously be dispersed in such a catalyst. Although an extremely homogeneous catalyst is prepared according to "Method B," an aqueous chromic acid solution can not dissolve 40 g. or more of copper oxide per 100 g. of chromium trioxide. Accordingly, no catalyst containing copper in an amount of ½ or more in terms of copper-chromium atomic ratio can be obtained, that is, no catalyst having high catalytic activity can be obtained.

The present invention provides a catalyst having an extremely high catalytic activity as well as excellent heat resistance and durability in producing methanol from hydrogen and carbon oxides and a preparation method thereof.

The catalyst according to the present invention is a Cu-Zn-Cr system catalyst having the composition of 10 to 90: 5 to 70:2 to 70, more preferably, 25 to 85:10 to 50:5 to 50, in terms of the atomic ratio of copper: zinc:chromium.

The catalyst of the present invention is prepared according to a process which comprises mixing chromium trioxide in the presence of water with a substance obtained by pyrolyzing basic ammonium copper chromate at 300° to 400° C. (this substance is hereinafter referred to briefly as "copper-chromium pyrolyzed product"), subsequently adding thereto basic copper carbonate and basic zinc carbonate and thereafter kneading the mixture followed by drying, first calcining the dried product at a temperature of 200° to 350° C. to pyrolyze basic copper carbonate and basic zinc carbonate and then further calcining the first calcined product at a temperature of 250° to 450° C.

In the following, the present invention will be explained more precisely referring to each step of the present procedure.

A. Mixing of copper-chromium pyrolyzed product with chromium trioxide

The ratio of the amount of the copper-chromium pyrolyzed product to that of chromium trioxide may be controlled to a range of 1:2 to 10 in terms of the atomic ratio of copper to chromium as the total sum of both compounds, i.e. 1 to 9 mole of chromium trioxide per 1 atom of copper in the copper-chromium pyrolyzed product. The mixing is conducted either under stirring or kneading in the presence of water. The copper-chromium pyrolyzed product which is obtained by pyrolyzing basic ammonium copper chromate at a temperature of 300° to 400° C., reacts at a relatively high speed with chromium trioxide to form an extremely homogeneous substance.

B. Admixing of basic copper carbonate and basic zinc carbonate

Basic copper carbonate and basic zinc carbonate are then added in amounts so that the final atomic ratio of Cu:Zn:Cr as the total sum of the four components including the two components in step A may become 10 to 90:5 to 70:2 to 70, more preferably, 25 to 85:10 to 50:5 to 50.

Basic copper carbonate and basic zinc carbonate may be added at a time, but it is more preferable to add and knead basic copper carbonate first and then add basic zinc carbonate followed by further kneading.

In said kneading, water must be present. Water may be added in an amount sufficient to knead the mixture, most preferably in an amount approximately equal to the weight of said mixture.

C. Drying and calcining

The mixed product obtained in step B is dried at a temperature of room temperature to 50° C. and thereafter calcined under a stream of air or an inert gas. Basic copper carbonate and basic zinc carbonate are first pyrolyzed by calcining. After the pyrolysis, further calcination (post calcination) is effected. The initial calcining, i.e. the calcining for pyrolysis is conducted at 200° to 350° C., preferably at 250° to 300° C. Within said temperature range, pyrolysis is terminated after 30 minutes to 30 hours. The end point is clearly seen from the fact that decomposed gases such as carbon dioxide, steam and the like are no longer generated. Post-calcining is effected at 250° to 450° C., preferably, at 300° to 400° C., for further 1 to 30 hours.

D. Reduction

The catalyst obtained by calcination as described above is reduced by conventional methods at 200° to 300° C. for 3 to 50 hours before it is put into use.

In accordance with the present invention, a catalyst having an extremely high catalytic activity as well as excellent heat resistance and durability is provided. Although the reason why such excellent features are imparted to the present catalyst is not yet completely elucidated, it may be construed just like as hereinunder mentioned. It should be understood, however, that the speculation given below is no more than a presumption and the present inventors have no intention to limit the scope of the present invention thereto.

As already mentioned above, in order for the catalyst to possess such excellent effects, it is required that a large amount of copper is finely and homogeneously dispersed among the zinc-chromium compound or the like. As one of effective means for that purpose, zinc oxide and chromium in the copper-chromium compound are allowed to react to form a zinc-chromium compound and, at the same time, isolate copper atom so that they may be mutually dispersed closely one into the other, and furthermore, the reaction proceeds gently. As shown below, the present catalyst presumably fulfills the requirements just mentioned above.

(1) The present reaction with basic copper carbonate and basic zinc carbonate proceeds more gently, than that where oxides themselves are directly used as raw materials, because the both carbonates participate in the reaction via step of decomposition to be converted into oxides.

(2) The decomposition of basic copper carbonate occurs mainly in the step of mixing under an acidic condition of chromium trioxide. On the other hand, the decomposition of basic zinc carbonate occurs mainly in the step of calcining, and slightly in the step of mixing. Accordingly, the reaction of copper oxide with chromium trioxide proceeds in advance.

(3) Two different species of copper-chromium compounds are formed. One is the copper-chromite containing tri-valent chromium derived from the copper-chromium pyrolyzed product. The other is the copper-chromate containing hexa-valent chromium derived from the reaction of copper oxide and chromium trioxide. Since the two species differ in reactivity with zinc oxide, the reaction between copper-chromium compound and zinc oxide proceeds as a whole extremely gradually and gently.

(4) The copper-chromium pyrolyzed product reacts by dissolution with chromium trioxide at a considerably high speed to form an extremely homogeneous solution. The reaction between chromium trioxide and copper oxide, under the situation above, brings a homogeneous mixture of copper-chromite and copper-chromate. Accordingly, said reaction as described in (3) occurs throughout the entire portion of the catalyst.

(5) On behalf of the post-calcination continued after pyrolysis of the carbonates, the above mentioned reactions proceed to a sufficient and enough extent.

(6) The oxides obtained by pyrolysis of the basic carbonates have minute crystal latices.

Thus, a catalyst finally obtained is in the form that a large amount of copper is dispersed sufficiently and minutely in the zinc-chromium compound and in addition the minutely distributed zinc oxide or zinc-chromium compound suppress the reduction of copper to prevent it from sintering.

The synthesis of methanol from carbon oxides and hydrogen in the presence of the present catalyst are conducted under substantially the same as conventional methods. The reaction temperatures is from 150° C. to 400° C., preferably from 200° to 300° C. The reaction pressure is from 10 to 400 atm., preferably from 30 to 300 atm. The space velocity (S.V.) is controlled to 200 to 80,000 hr.$^{-1}$, preferably 400 to 20,000 hr.$^{-1}$. The starting gases are mixed gases containing carbon oxides including carbon monoxide and carbon dioxide in amounts of the total sum thereof from 2 to 33 vol. percent, preferably from 5 to 25 vol percent and hydrogen in amounts from 50 to 95 vol percent, preferably from 65 to 85 vol percent.

The present invention will now be further explained by referring to the following Examples and the Comparative examples, wherein the catalytic activity is indicated by the concentrations of methanol contained in the output gases.

Examples 1, 2 and Compartive Examples 1 to 4

Into a liquid prepared by dissolving 8.3 g. chromium trioxide in 15 ml. water was added 8.6 g. copper-chromium pyrolyzed product at 300° to 350° C. After the composite was kneaded for 30 minutes, 9.5 g. basic copper carbonate was added thereto and further kneading was continued for 30 minutes to obtain a copper-chromium compound insoluble in water. 15 ml. of water was added to the mixture and the mixture was kneaded for 30 minutes with 14.5 g. basic zinc carbonate in gruel form. The pastelike substance obtained was collected in a Schale and spread in about 1 cm. thick and dried overnight at 50° to 70° C. The dried product was crushed to powders of 10 mesh or less, calcined under a stream of nitrogen at 300 ° C. for 30 hours (pyrolysis was terminated after one hour), and thereafter formed into tablets by the use of graphite as lubricants. Subsequently, these tablets were crushed to 20 to 40 mesh and reduced by methanol synthetic gases under atmospheric pressure at 200° to 250° C. for 20 hours. The composition of the catalyst obtained was Cu:Zn:Cr=1:1:1 in terms of atomic ratio. The activity was tested for the catalyst thus obtained by blowing a gas comprising 67 percent $H_2$, 25% CO, 5% $CO_2$, 1 percent $CH_4$ and 2% $N_2$ under pressure of 150 kg./cm.$^2$ at a space velocity of 10,000 hr.$^{-1}$ at 260° C. and 280° C. In order to observe the depression in activity after used for synthesis, a similar activity test was also conducted for the catalyst which had been used for the synthesis at 400° C. for 2 hours. The results are shown in Table 1 as Example 1.

Then, the activity test was conducted similarly as described above for the catalyst which had been prepared according to the same procedure as described in Example 1 except that calcining had been conducted at 350° C. for 3 hours (pyrolysis was terminated after 30 minutes). The results are shown in Table as Example 2.

For comparison, four kinds of catalysts were prepared by the methods of prior art. The activity tests were carried out of reach of them in the same manner as described in Example 1. The results are shown in Table 1 as comparative examples 1 to 4. The atomic ratio of copper:zinc:chromium of each catalyst was thereby controlled to 1:1:1.

The catalyst of comparative example 1 was prepared according to the following procedure. Into an aqueous solution dissolving 150 g. chromium trioxide in 130 ml. water was added 122 g. of gruel-like zinc oxide prepared by admixing with 120 ml. water, together with 50 ml. washing water. After the composite was mixed and kneaded for about two hours, 480 g. paste-like copper hydroxide (containing 120 g. copper calculated as copper oxide) precipitated at 80° C. from a 1/10 N-copper nitrate solution and a 1/10 N-caustic soda solution, was added and kneaded for about 5 hours together with 200 ml.

water. The product was dried overnight at 80° C., crushed to 20 to 40 mesh and subjected to reduction whose conditions are the same as described in Example 1.

The catalyst of compartive example 2 was prepared according to the following procedure. One hundred (100) ml. of each an aqueous solution of copper nitrate, zinc nitrate and chromium nitrate having the concentration of 1 mole/1 were mixed together. While stirring the mixture under heating to 70° to 80°C., an aqueous ammonia diluted to 15 times of conc. aqueous ammonia was titrated thereinto. Said titration was terminated at pH 6.2 to 6.4 (titration amount: about 440 ml. titration time: 45 minutes). After the solution is subjected to a stirring at 70° to 80° C. for 30 minutes, filtration was effected under suction. The product obtained was rinsed with about 60 ml. warm water and dried over night at 80° C. The product was calcined at 250° C. for 3 hours under a nitrogen stream to convert into oxides. The calcined catalyst was thereafter formed in tablets by the use of graphite as lubricants. It was then crushed to 20 to 40 mesh and reduced under the same as in Example 1.

The catalyst of compartive example 3 was prepared as follows. 120 ml. of water were mixed with 81.4 g. zinc oxide powder (extra pure) and 79.6 g. copper oxide (extra pure) and the mixture was kneaded for 2 hours. An aqueous solution (200 ml.) containing 100 g. chromium trioxide was added and kneaded for about 5 hours. The paste obtained was dried at 80° C. overnight, sieved by a 20 to 40 mesh screen and reduced. The reduction was conducted under the same conditions as in Example 1.

The catalyst of comparative example 4 was prepared as follows. An aqueous solution of zinc nitrate and copper nitrate (extra pure) [atomic ratio of copper to zinc=1:1] was dropped in a 15% aqueous caustic soda solution to depricipitate copper and zinc hydroxides. The precipitation was effected quantitatively at pH 6.2 to 6.4. There was produced slurry of coprecipitate which was comparatively uniform. When temperature is high, a part of copper was in the form of oxide. The precipitate was filtered, rinsed thoroughly and dried at 100° C. An aqueous chromic acid solution (50% solution) whose chromium is equivalent to the copper was added and kneaded thoroughly before drying overnight at 100° C. to 110° C. again. The product was ground to 20 to 40 mesh size and reduced under the same conditions as in Example 1.

TABLE 1

| Experiment number | Methanol concentration in output gas (mol percent) | | | |
|---|---|---|---|---|
| | Initial activity | | Activity after synthesis for 2 hours at 400° C. | |
| | 260° C. | 280° C. | 260° C. | 280° C. |
| Example: | | | | |
| 1 | 26.6 | 33.8 | 31.2 | 35.0 |
| 2 | 31.4 | 35.5 | 33.0 | 36.0 |
| Comparative example: | | | | |
| 1 | 4.5 | 12.0 | 3.0 | 7.5 |
| 2 | 17.5 | 28.3 | 8.8 | 17.3 |
| 3 | 2.0 | 5.5 | 1.0 | 3.4 |
| 4 | 10.0 | 18.5 | 9.6 | 18.0 |

As is seen in the Table, the present catalyst is highly active, substantially reaches equilibrium at 280° C. and is superior in heat resistance and durability.

Examples 3–5

Three catalysts were prepared according to the same procedure as of Example 1 except amounts of raw materials were changed.

Activity tests were conducted by using the same gas and SV as in the Example 1 and the results were shown in Table 2 as Examples 3 to 5.

TABLE 2

| Experiment number | Cu:Zn:Cr atomic ratio | Methanol concentration in output gas (mol percent) | | | |
|---|---|---|---|---|---|
| | | Activity after synthesis for 2 hours at 400° C. | | Activity after synthesis for 10 hours at 400° C. | |
| | | 250° C. | 270° C. | 250° C. | 270° C. |
| Example: | | | | | |
| 3 | 2:2:1 | 19.0 | 32.3 | 16.0 | 31.5 |
| 4 | 3:3:1 | 14.0 | 30.5 | 13.0 | 29.5 |
| 5 | 3:1:1 | 15.6 | 31.8 | 12.5 | 29.0 |

From the above, it is clear that the present catalyst has high activity, excellent heat resistance and durability over the wide composition range.

Comparative Example 5

Catalyst was prepared according to the same procedure as Example 1 except calcination was no longer effected beyond the time when pyrolysis of unaltered carbonates was completed, i.e., at 300° C. for 1 hour.

Activity test was effected as in Example 1 and initial activities were 21.5% and 30.5% at 260° C. and 280° C., respectively, and 18.0% and 28.0% at 260° C. and 280° C., respectively, after synthesis for 2 hours at 400° C.

From the above, it is clear that post-calcination is essential after pyrolysis of carbonates is completed.

Example 6

Activity of the catalyst of Example 2 was tested at pressure of 40 kg./cm.$^2$, space velocity of 2000 hr.$^{-1}$ and various temperatures, using gas consisting of 67.3% $H_2$, 22% CO, 9.0% $CO_2$, 1.5% $CH_4$ and 0.2% $N_2$. Concentrations of methanol in output gas at 202° C., 220° C., 237° C., and 250° C. of reaction temperature were 4.7%, 9.9%, 14.2% and 12.0%, respectively, and percentages to reach equilibrium were 14.3%, 36.1%, 66.8% and 72.0%, respectively.

From the above, it is clear that the present catalyst has high activity even under low pressure, which has not been experienced in conventional catalysts.

Example 7

Activity test was conducted on the catalyst of Example 2 as in Example 1 using the same gas and space velocity at 260° C. after synthesis at 400° C. except time for synthesis at 400° C. was changed, and concentration of methanol in output gas were 31.4%, 33.0%, 35.5% and 34.0% when the periods of time were 2, 10, 20 and 40 hours, respectively.

From the above, it is clear that the present catalyst is superior in heat resistance and durability.

What we claim is:

1. A method of manufacturing a copper oxide-zinc oxide-chromium oxide catalyst for use in the synthesis of methanol from hydrogen and carbon oxides which comprises mixing, in the presence of water, chromium trioxide with a copper-chromium pyrolyzed product obtained by the pyrolysis of basic ammonium copper chromate at 300° to 400° C., in an amount such that 1 to 9 mol of chromium trioxide is present for every copper atom in said pyrolyzed product, adding to the above-obtained mixture basic copper carbonate and basic zinc carbonate so that the atomic ratio of Cu:Zn:Cr is 10 to 90:5 to 70:2 to 70, kneading the mixture followed by, drying, initial calcining at 200 to 350° C. and post-calcining at 250 to 450° C.

2. The method according to claim 1 wherein the atomic ratio of Cu:Zn:Cr is 25 to 80:10 to 50:5 to 50.

3. The method according to claim 1 wherein the basic copper carbonate is first added and then the basic zinc carbonate is added.

4. The method according to claim 1 wherein the initial calcining and the post-calcining are conducted in the presence of an inert gas or air.

5. A method of manufacturing a uniformly distributed copper oxide-zinc oxide-chromium oxide catalyst which has the ability to retain a high activity, thermal resistance and durability when used in the synthesis of methanol from hydrogen and carbon oxides which comprises mixing, in the presence of water, chromium trioxide with a copper-chromium pyrolyzed product obtained by the pyrolysis of basic ammonium copper chromate, in an amount such that 1 to 9 mol of chromium trioxide is present for every copper atom in said pyrolyzed product, adding to the above-obtained mixture basic copper carbonate and basic zinc carbonate so that the atomic ratio of Cu:Zn:Cr is 10 to 90:5 to 70:2 to 70, and drying the mixture followed by initial calcining at 200 to 350° C. and post-calcining at 250 to 450° C.

6. The method according to claim 1, wherein the initial calcining is conducted at a temperature of 250° to 300° C. and the post-calcining conducted at a temperature of 300° to 400° C.

7. The method according to claim 6, wherein the initial calcining is conducted for 30 minutes to 30 hours and the post-calcining is conducted for 1 to 30 hours.

8. The method according to claim 5, wherein the initial calcining is conducted at a temperature of 250° to 300° C. and the post-calcining is conducted at a temperature of 300° to 400° C.

9. The method according to claim 8, wherein the initial calcining is conducted for 30 minutes to 30 hours and the post-calcining is conducted for 1 to 30 hours.

References Cited
UNITED STATES PATENTS

| | | | |
|---|---|---|---|
| 2,014,883 | 9/1935 | Dodce | 260—449.5 |
| 3,326,956 | 6/1967 | Davies et al. | 252—468 X |

DANIEL E. WYMAN, Primary Examiner

WILLIAM J. SHINE, Assistant Examiner

U.S. Cl. X.R.

260—449.5